Sept. 20, 1966    R. MATTHEY    3,273,949
SHOCK-ABSORBING BEARING FOR SMALL MECHANISMS
Filed April 7, 1964
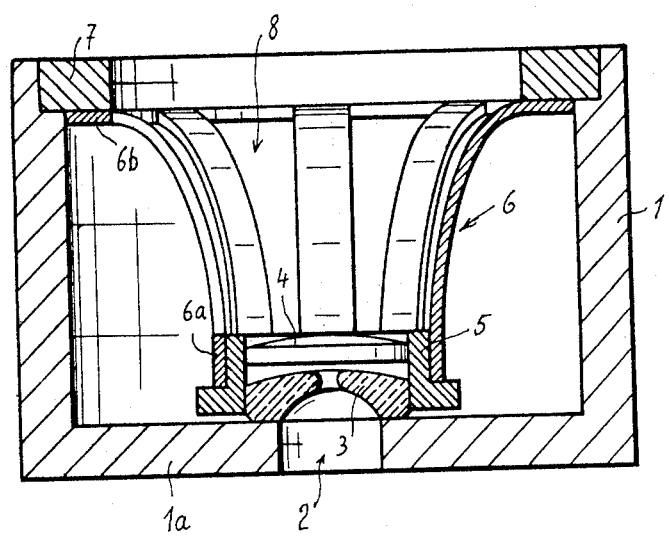
INVENTOR.
ROGER MATTHEY
BY Kenwood Ross
ATTORNEY

United States Patent Office 3,273,949
Patented Sept. 20, 1966

3,273,949
SHOCK-ABSORBING BEARING FOR SMALL
MECHANISMS
Roger Matthey, Le Locle, Switzerland, assignor to
Parechoc S.A., Canton of Vaud, Switzerland, a
firm of Switzerland
Filed Apr. 7, 1964, Ser. No. 357,921
Claims priority, application Switzerland, May 9, 1963,
5,817/63
4 Claims. (Cl. 308—158)

The present invention has for its object to provide a shock-absorbing bearing for small mechanisms, comprising a bearing support, in which is mounted, with a degree of play, a bearing body which is subject to the action of a return spring.

The bearing is characterised by the fact that the said spring has the general shape of a circular body formed by the rotation, around a geometrical axis, of a curved generating line. An extremity of the said spring, which is substantially tubular, carries the said bearing body, and its other extremity, situated approximately in a plane perpendicular to the axis of the spring, bears on the bearing support, this spring being provided with two elongated longitudinal apertures, producing between them flexible blades, elastically deformable, so as to allow the tubular part of the spring to be displaced in any direction, the whole being such that the spring absorbs the axial as well as the radial shocks to which the shaft is subjected.

The drawing shows, by way of example, one embodiment of the invention.

The figure is an axial section of a shock-absorbing bearing for small mechanisms.

This bearing comprises a sleeve shaped support 1, the bottom part 1a of which is pierced with a central hole 2 for the passage of the shaft, not represented.

This bearing comprises a bearing body constituted by a pierced jewel 3 constituting the bearing, a cap jewel 4, and a setting 5 common to the two jewels in which they are forced. This bearing body rests, when the bearing is in its normal operating position, by means of the pierced jewel 3, on the bottom 1a of the bearing support 1, on which it is centered by a spring 6.

This spring has the shape of a circular body obtained by the rotation of a curved generating line around a geometrical axis.

It is provided, at its extremity of small diameter, with a tubular part 6a, disposed parallel to its axis, and engaged on the setting 5. Its other extremity, of great diameter, is provided with an annular part 6b located in a plan perpendicular to the axis of the spring. This annular part 6b bears on a ring 7 forced in the bearing support 1 and which thus constitutes an inner shoulder of this support.

The spring 6 is provided with longitudinal apertures 8 which define therebetween elastic curved blades allowing the extremity 6a of the spring, and consequently the bearing body, to be displaced in any direction. Thus, the spring 6 absorbs the axial as well as the radial shocks to which the shaft is subjected.

As a modification, it will be possible to have the apertures 8 extend up to the upper extremity of the spring, the annular part 6b being then suppressed. The free extremities of the elastic blades would then bear on an inner shoulder of the bearing support and an annular play would be kept between them and the lateral wall of the bearing support so that, during the axial shocks, these free extremities of the elastic blades would move aside while sliding on the shoulder on which they bear.

What I claim is:

1. In a shock-absorbing bearing for small mechanisms, comprising a bearing support and a bearing body located within the said support, and a return spring acting on the said bearing body, said spring being in the shape of a circular body formed by the rotation around a geometrical axis of a curved generating line and having a substantially tubular extremity for carrying said bearing body and an opposite extremity located approximately in a plane perpendicular to the axis of said spring and bearing on said bearing support, said spring being provided with longitudinal elongated apertures to define elastically-deformable flexible blades therebetween for allowing the tubular part of said spring to be displaced in any direction, with said spring absorbing the axial as well as the radial shocks to which said bearing body is subject.

2. In a shock-absorbing bearing as claimed in claim 1, in which the other extremity of said spring includes a large diameter for bearing on said bearing support.

3. In a shock-absorbing bearing as claimed in claim 1, in which the apertures extend on a part of the length of said spring for providing a continuous annular part at each of their extremities.

4. In a shock-absorbing bearing as claimed in claim 1, in which the apertures extend in the direction of the extremity of said spring adjacent the tubular extremity and to the edge of the circular body, with the tubular extremity being situated substantially in a plane perpendicular to the axis of said spring.

References Cited by the Examiner

UNITED STATES PATENTS 3,005,667  10/1961  Loretan _____ 308—159

FOREIGN PATENTS 272,620  4/1951  Switzerland.

DAVID J. WILLIAMOWSKY, Primary Examiner.

FRANK SUSKO, Examiner.